United States Patent [19]
Fruth et al.

[11] 4,176,256
[45] Nov. 27, 1979

[54] CIRCUIT ARRANGEMENT FOR TIME-DEPENDENT MONITORING OF THE STATE OF LINES

[75] Inventors: Albert Fruth, Germering; Juergen Harenberg, Munich, both of Fed. Rep. of Germany

[73] Assignee: Siemens Aktiengesellschaft, Berlin & Munich, Fed. Rep. of Germany

[21] Appl. No.: 919,824

[22] Filed: Jun. 28, 1978

[30] Foreign Application Priority Data

Jul. 18, 1977 [DE] Fed. Rep. of Germany ....... 2732392

[51] Int. Cl.² .......................................... H04M 3/22
[52] U.S. Cl. .............................................. 179/18 FG
[58] Field of Search ................................. 179/18 FG

[56] References Cited
U.S. PATENT DOCUMENTS

| 3,800,094 | 3/1974 | Schwarzer | 179/18 FG |
| 3,894,191 | 7/1975 | Sassa | 179/18 FG |

*Primary Examiner*—William C. Cooper
*Attorney, Agent, or Firm*—Hill, Van Santen, Steadman, Chiara & Simpson

[57] ABSTRACT

Circuit arrangement for time-dependent monitoring of the condition of lines with a scanning device operating with the so-called "last-look" method, which recognizes condition alterations on the line and which produces a message supplemented by the address which corresponds with the scanned line. The time-dependent evaluation is obtained by comparing an adjustable theoretical time placed in a memory with an actual time formed by a counter.

5 Claims, 2 Drawing Figures

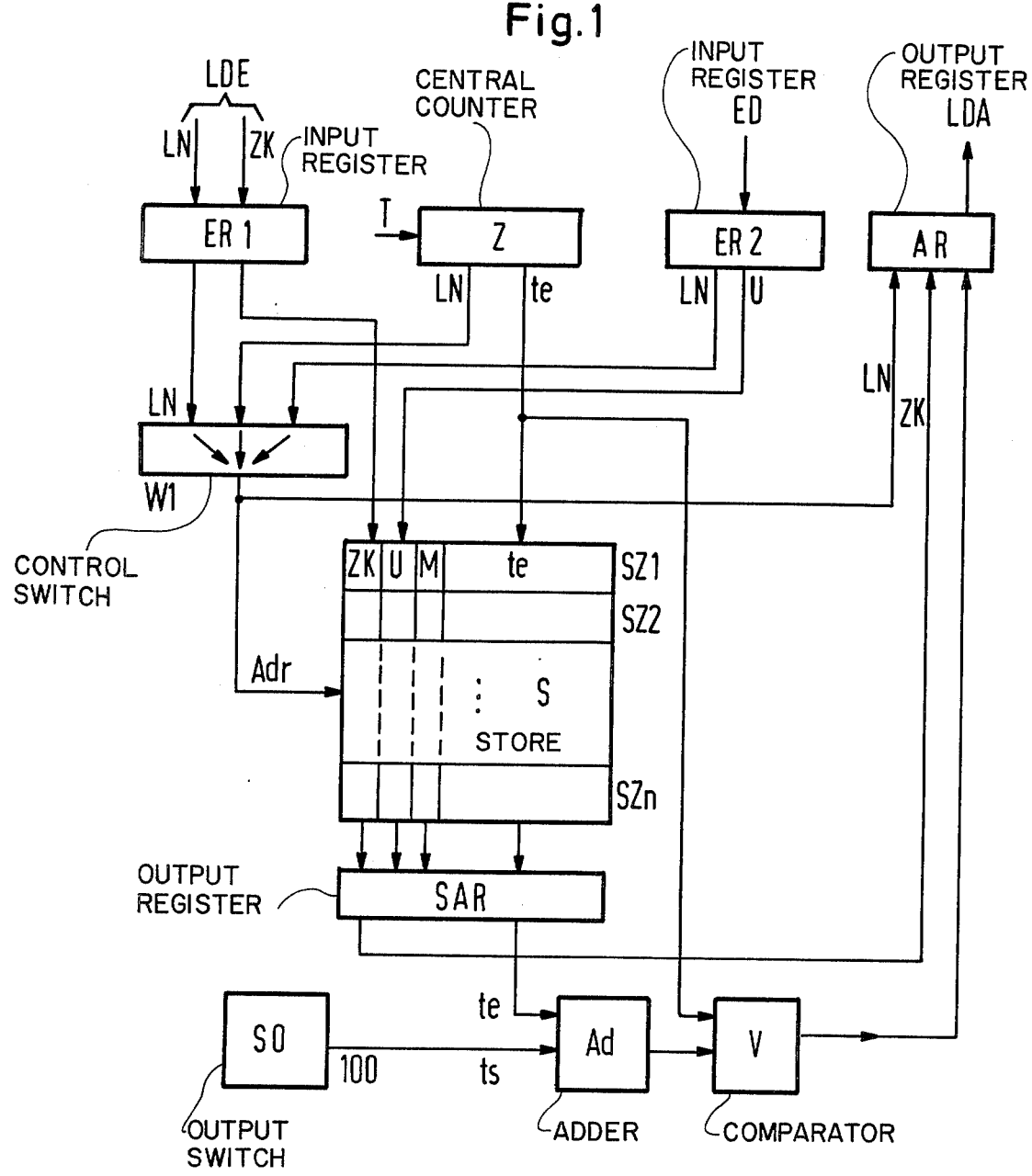

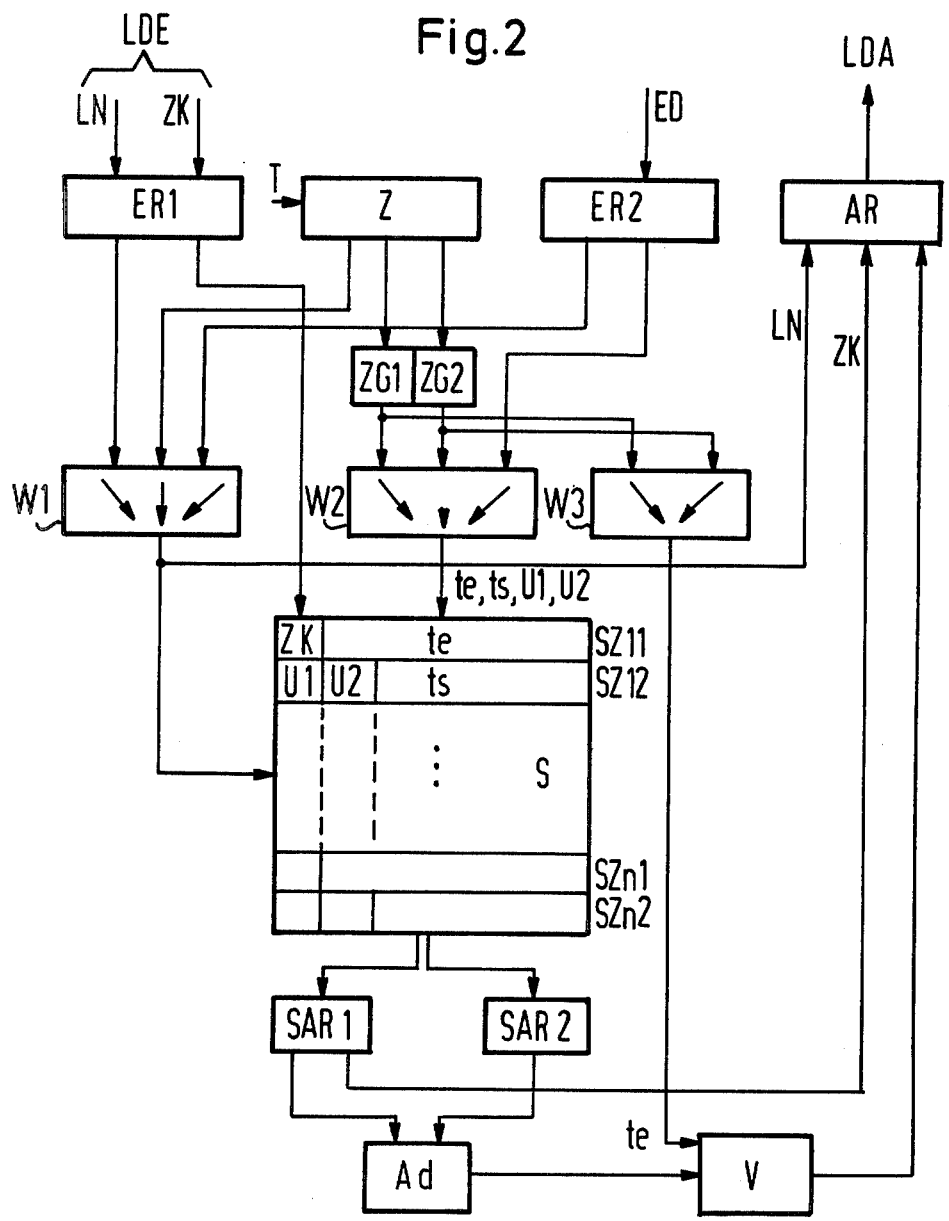

CIRCUIT ARRANGEMENT FOR TIME-DEPENDENT MONITORING OF THE STATE OF LINES

BACKGROUND OF THE INVENTION

The invention relates to a circuit arrangement for the time-dependent monitoring of the state prevailing on lines, comprising a device in which, in the event of a change in state on a line, a line address which identifies the line and a state criterion which indicates the change in state are formed.

In order to allow state changes on lines, for example, on connection lines or data lines connected to an exchange, to be recognized a circuit arrangement has been proposed in U.S. Pat. No. 3,576,399 (see also German published application No. OS 26 41 913), wherein the lines, combined to form groups, are interrogated in accordance with the so-called "last-look" process and those lines which exhibit changes in state are identified. As a result of such an interrogation, criteria are available regarding the change in state and the line addresses of those lines upon which the state changes have occurred. In addition to recognizing the change in state and identifying the relevant line, in many cases it is necessary to carry out a time-dependent monitoring of the changes in state. Call recognition may be mentioned as an example. This is to be understood in that a change in state which signals a change from a stipulated reset state to a stipulated call state cannot be evaluated as call criterion until the expiration of a predetermined length of time. Short term changes in state resulting from interference influences are thus suppressed.

SUMMARY OF THE INVENTION

The aim of the invention is to provide a device for the time-dependent monitoring of the state of lines. This aim is realized in that a store is provided which can be operated via a first control switch by the line address, by the count of a central counter or by an address input, and into the storage cells which are each assigned to a line, there are input at least the state criterion, a monitoring criterion which indicates the monitoring, and an event time which indicates the time of the occurrence of the change in state, that all the storage cells of the store can be consecutively interrogated, being addressed by the central counter, wherein, following each interrogation cycle which covers all the storage cells, the value for the event time is increased by 1 in accordance with the current count of the central counter, that the interrogation result is logic-linked in an adder circuit with a theoretical time which indicates the duration of the monitoring, and that a comparator is provided in which the result formed in the adder circuit is compared with the current count of the central counter, and which, in the case of a positive comparison, emits an item of message information which comprises the relevant line address and the state criterion.

An arrangement of this kind possesses the advantage of a simple construction and permits the emission of messages indicating the change in state and the line address, taking into consideration adjustable monitoring times. The monitoring time can be fixed by providing a simple switch. As each line in the store is assigned a specific storage cell, it is also possible to set the monitoring time individually and to be variable at any time for any line. In this case, the corresponding criteria are contained in the store itself. By means of further criteria which can be entered in the store, it is advantageously possible to monitor more than one state in time-dependent fashion, thus, for example, by entering two monitoring criteria, it is possible to monitor changes in state from 0 to 1 and from 1 to 0.

Further details of the invention will be given in the following making reference to the drawings, in which

BRIEF DESCRIPTION OF THE DRAWINGS

FIG. 1 illustrates an exemplary embodiment in which the monitoring time is fixed and wherein each line is assigned one storage cell in the store.

FIG. 2 illustrates a further exemplary embodiment wherein each line is assigned two storage cells and with which it is possible to monitor two states taking into account individually adjustable monitoring times.

DESCRIPTION OF THE PREFERRED EMBODIMENTS

The exemplary embodiment illustrated in FIG. 1 is based on the condition that only one direction of change in state (in the example, this being the change from the state 0 to 1), is to be monitored, and for all the connected lines the monitoring time possesses the same value for the state 1. The line address LN and the state criterion ZK are available via an input for the data line LDE and are transferred into an input register ER1. Under the control of the address line LN, the state criterion ZK is entered via the control switch $W_1$ into that storage cell of the central store S determined by the address line and assigned to this line. In order to establish the event time, i.e., the time at which the state criterion is entered in the store, the central counter Z is provided which is stepped via a centrally formed pulse train T and whose count, as event time te, is likewise entered into the addressed storage cell. The storage cells also contain a monitoring criterion U which indicates whether the relevant line is to be monitored or not. For this purpose, input data ED are available which are transferred into a second input register ER2 from where they are entered into the store S; here the line number LN serves as address by which a specific storage cell assigned to the relevant line is addressed via the control switch $W_1$. The setting of the monitoring time, which in the following will be referred to as theoretical time ts, is carried out in the present exemplary embodiment via a switch SO which emits the theoretical time as a binary pattern from its output. Via a store output register SAR there are available the event time te and the theoretical time ts of an adder circuit AD whose output is connected to an input of a comparator circuit V whose second input carries the current event time te. Via an output register AR, in the event of a positive comparison, a message is emitted which, together with the line address and the state criterion, is available for further processing as output data LDA via an output register AR.

In the following, the mode of operation of the exemplary embodiment illustrated in FIG. 1 will be described in detail. The time-dependent monitoring and evaluation of the changes in state is carried out under the control of the central counter Z which operates as a ring counter within the form of consecutive interrogation cycles, where all the storage cells SZ1 to SZn of the store S are worked through in a cyclic pattern. The duration of an interrogation cycle of all the storage cells is then the shortest time interval for the monitoring time. Theoretical times and event times are formed as multiples of this time interval. In the case of the event time te, this is carried out in that with each interrogation cycle the value for the event time te is increased by 1. Incoming changes in state each lead to an interruption in this interrogation cycle, to a switching over of the control switch $W_1$, and to the state criterion being entered, together with the current event time te, in that storage cell of the store appointed by the line number. Assuming that an interrogation cycle requires 6 ms and that a theoretical time ts=24 ms is required, which corresponds to four times an interrogation cycle, the bit pattern 100 (4×6 ms) is available as theoretical time ts at the output of the switch SO. If the state criterion ZK which has been formed as a result of a change in state from 0 to 1, is entered at the current event time te with the bit pattern 010, the bit pattern of this event time is entered, together with the state criterion, into the addressed storage cell. During each interrogation cycle, this storage cell is operated on the basis of the line number LN emitted from the central counter Z and the contents of the storage cell is transferred into the store output register SAR. A simultaneous check is effected to establish whether the monitoring criterion U is set or not. If this is so, the read-out event time te is logic-linked with the set theoretical time ts in the adder circuit and offered to the comparator. In the present example, the addition of the time bits which indicate the event time and are entered in the store and the time bits which indicate the theoretical time produces 110. Following the first interrogation cycle, the current event time te which is offered to the second input of the comparator V amounts to 011 which leads to a negative comparison result and thus to no emission of a message. Only after the fourth interrogation cycle is the bit pattern 110 present as the now current event time te at the second input of the comparator V, which leads to a positive comparison result and to the emission of a message which, together with the address relating to this storage cell and the state criterion ZK contained in this storage cell, is then emitted via the output register AR.

However, in many cases, it is necessary not to provide fixed values for all the lines as monitoring time, but to assign individual monitoring times to the individual lines. Furthermore, frequently it is necessary to monitor not only one direction of change in state, but, in addition to monitoring a direction change from 0 to 1, to also monitor the direction change from 1 to 0 in time-dependent fashion. A circuit arrangement which fulfills these requirements and is based on the principle of the invention is illustrated in the exemplary embodiment in FIG. 2.

In the exemplary embodiment illustrated in FIG. 2, the input data LDE, namely the line address LN and the state criterion ZK are offered via the input register $ER_1$ to the store S, where again the address serves to operate the store S via the control switch $W_1$. Here, however, in the store S each line is assigned two storage cells $SZ_{11}$, $SZ_{12}$ to $SZ_{n1}$, $SZ_{n2}$. The central counter Z which is again designed as ring counter, as already described with reference to FIG. 1, has access to the store S via the control switch $W_1$ in order to facilitate the cyclic interrogation of all the storage cells on the basis of its count. As already described with reference to FIG. 1, the monitoring criterion is offered as part of the input data ED and is entered via the control switch $W_1$ in the storage cells assigned to the corresponding lines, where the line addresses are again derived from the input data ED. As now two directions of a change in state are to be monitored in time, two monitoring criteria $U_1$ and $U_2$ are provided. Furthermore, the theoretical time ts is also taken from the input data ED and entered via a further control switch W2 into a specific, operable storage cell. The address of this specific storage cell here is obtained from the input data and is fed via the control switch $W_1$ to the store S. This provides the possibility of an individual setting of the monitoring time. In accordance with monitoring of two directions of change in state, here two additional timers ZG1 and ZG2 are provided which are controlled via the central counter Z which can be stepped on by the pulse train T, and which each form the current even time te. The two timers ZG1 and ZG2 can be connected via the control switch W2 to the store S and are also connected via a third control switch W3 to an input of the comparator circuit V. The items of information taken from the store during an interrogation cycle are transferred into two store output registers SAR1 and SAR2 from which they are fed to the adder Ad which itself transfers the result of the addition of event time te and theoretical time ts to the second input of the comparator V. As in this case a line is assigned two storage cells, for the example, the storage cells $SZ_{11}$ and $SZ_{12}$, and the first storage cell contains the state criterion ZK and the event time te, whereas the second storage cell contains the monitoring criteria U1 and U2 and the theoretical time ts, the associated storage cells assigned to a line are read out consecutively. In the present example, the second storage cell is the first to be read out, and it is checked whether a monitoring is to take place or not and, if a monitoring is necessary, which direction of the change in state is to be monitored ($U_1$ or $U_2$ =1); if the monitoring criterion is recognized as set, the other storage cell—in the present example, the first—is also read out.

The mode of operation of the circuit arrangement is described in detail in the following. During the consecutive interrogation cycles controlled by the central counter Z, all the storage cells of the store are worked through, the second of the associated storage cells in each case being read out first, and, if the monitoring criterion was set, the first storage cell is also read out. At the same time, following an interrogation cycle which covers all the storage cells, the count of the timers ZG1 and ZG2 is increased by 1 so that the current event time is always available at the input of the store and, via the control switch W3, at the input of the comparator. If changes in state occur at the input of the receiving register ER1 during the interrogation cycle, the interrogation cycle is interrupted, the control switch W1 is switched over, and the new state criterion together with the current event time te, is entered at that point of the store addressed by the line number, i.e., into the storage cell assigned to the relevant line. If, in accordance with the conditions selected for the example illustrated in FIG. 1, it is assumed that the duration of an interrogation cycle amounts to 6 ms and that the theoretical time is established as ts=24 ms, which signifies that the theoretical time bit pattern 100 (4×6 ms) is entered in the corresponding storage cell, and if it is further assumed that the state to be monitored occurs at a time at which the corresponding timer emits the bit pattern 010 as value of the current event time te, it will again be clear that the addition result emitted from the output of the adder circuit Ad amounts to 110. Following the first interrogation cycle, the addition result 110 and, as current event time te, the bit pattern 011 are available to the comparator V. As the comparator does not recognize identity, no message is emitted. Also following the second interrogation cycle, after which the current event time possesses the bit pattern 100 and after the third interrogation cycle following which the current event time possesses the bit pattern 101, no message is emitted. Not until following the fourth interrogation cycle does the bit pattern 110 appear as current event time at the input of the comparator; this corresponds to the addition result and at the output of the comparator produces a message which, together with the address offered via the counter Z and the first control switch W1 and together with the state criterion ZK read out from the addressed storage cell, is fed into the output register AR from where it is available to further processing units.

As a result of the predetermined time conditions and the duration of an interrogation cycle, the tolerance range for the quoted example is 24 ms±6 ms. Basically, the tolerance is dependent only upon the time of arrival of a change in state during an interrogation cycle and upon the time of the evaluation of the relevant line in the following interrogation cycles. It is possible to fulfill all tolerance requirements occurring in practice by virtue of the selection of the central pulse train T which controls the central counter Z and thus also the timers ZG1 and ZG2.

It will be apparent to those skilled in the art that many modifications and variations may be effected without departing from the spirit and scope of the novel concepts of the present invention.

We claim as our invention:

1. Circuit arrangement for the time-dependent monitoring of the states occurring on lines, comprising a device in which, on the occurrence of a change in state on a line, a line address which identifies the line and a state criterion which indicates the change in state are formed, comprising a store, a central counter, a control switch, a store which can be operated via said control switch by a line address, by a count of said central counter or by an address input, said store having a plurality of sets of storage cells which are each assigned to a line, there being an input for the store criterion, a monitoring criterion which indicates the monitoring, and an event time which indicates the time of the occurrence of the change in state, all said storage cells of said store being consecutively interrogated under the control of said central counter, and following each interrogation cycle which covers all the storage cells, the value of said event time being increased by 1 in accordance with the current count of said central counter, the interrogation result being logic-linked in an adder circuit with a theoretical time which indicates the duration of the monitoring, and a comparator being provided in which the result formed in said adder circuit is compared with the current count of said central counter and which in the case of a positive comparison emits an item of message information which comprises the relevant line address and the state criterion.

2. Circuit arrangement as claimed in claim 1, in which within said store in respect to each line there is provided a storage cell which serves to accommodate said event time, said monitoring criterion, said state criterion, and a noter bit which indicates the emission of a message, and an adjustable switch is provided for the input of said theoretical time.

3. Circuit arrangement as claimed in claim 2, in which within said store in respect to each line there is provided for each line two storage cells of which one storage cell contains said state criterion and said event time, and the other contains said monitoring criterion and the theoretical time, that for the formation and input of said event time there being provided a timer which is pulsed by said central counter and connected to said store via a second control switch, during an interrogation cycle first the contents of said storage cell which contains said monitoring criterion is transferred into an output register, and only when said monitoring criterion has been checked is the contents of the other of said set of storage cells also transferred into a further output register, the event time and the theoretical time contained in said two output registers, following logic-linking in said adder circuit, are fed to the one input of said comparator whose second input is connected via a third control switch to said timer.

4. Circuit arrangement as claimed in claim 3, in which said first and second control switches each possess a further terminal connected to an input register for centrally formed input data and in which said theoretical time and said monitoring criterion is transferred in specific storage cells by said second control switch, and the address of said storage cells transferred by said first control switch.

5. Circuit arrangement as claimed in claim 4, in which for the monitoring of two changes in state, two timers are provided which can be connected via said second control switch to said store, and two monitoring criteria can be entered into said store via said second control switch.

* * * * *